United States Patent Office 2,701,314
Patented Feb. 1, 1955

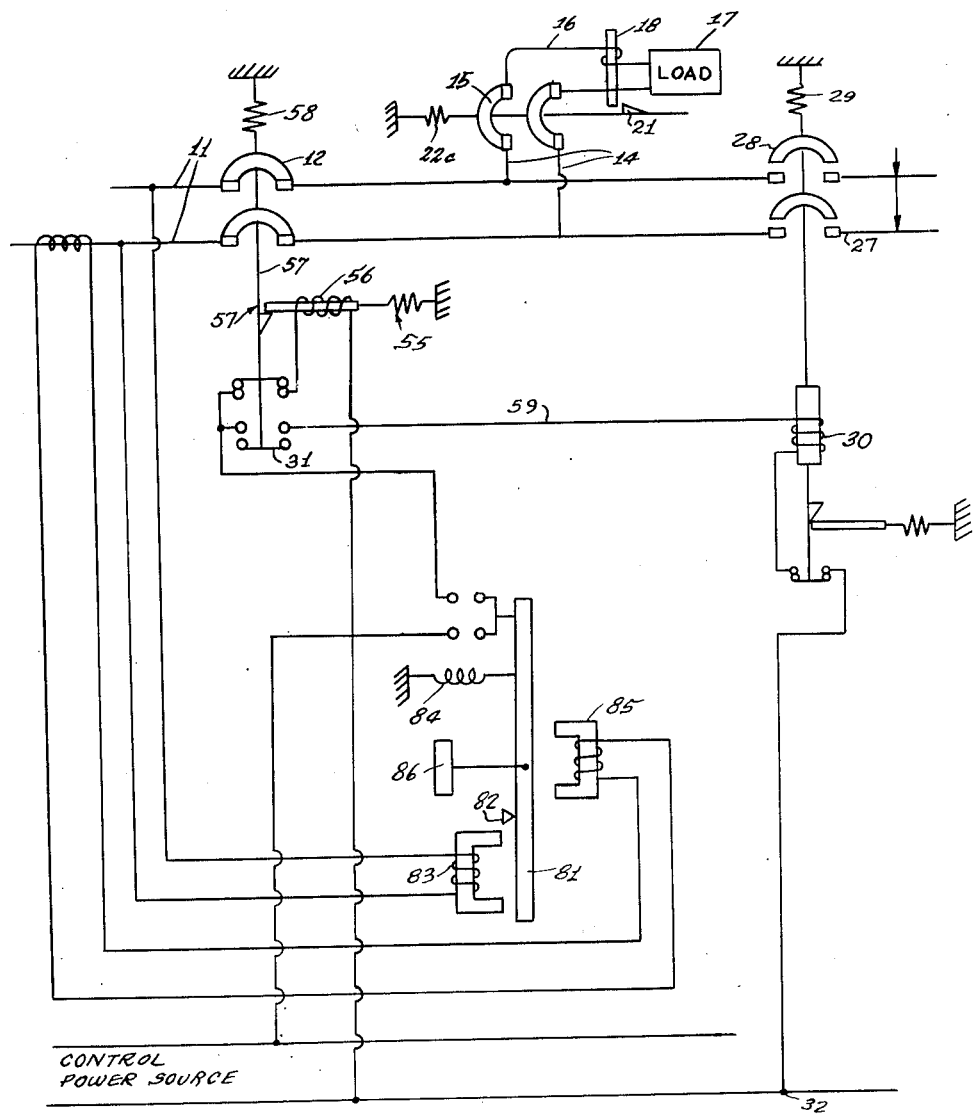

2,701,314

POWER TRANSFER SYSTEM

Amado Conangla, Sharon Hill, Pa., assignor to I-T-E Circuit Breaker Company, Philadelphia, Pa., a corporation of Pennsylvania Application July 13, 1951, Serial No. 236,674

6 Claims. (Cl. 307—64)

My invention relates to power transfer systems in which provision is made for loads to be transferred from a primary source to an emergency source when the primary source fails.

More specifically, my invention relates to a novel arrangement of an undervoltage relay which is responsive both to voltage and current so as to distinguish a voltage drop due to momentary overloads caused by short circuits or by starting motors and voltage loss at the primary source of power.

In electric power supply systems it is presently the practice to provide a primary source of power and an emergency source with switching means for connecting the loads to either source of supply.

In such systems an undervoltage relay is connected across a first or primary source of power and is responsive to a drop in voltage at the primary source due to a failure of the primary source. Such an undervoltage responds to a drop in the voltage across the primary source to operate circuit breakers, contactors or power operated switches for disconnecting the loads from the normal source and connecting the loads to a second or emergency source.

However, it often happens that heavy currents, as for example, those which flow when starting a motor may momentarily cause a voltage fluctuation of the normal source sufficient to operate the usual voltage response relay. This would initiate a transfer from the primary to the emergency source which would be undesirable under the circumstance.

Moreover, as is well-known in the art, when a heavy current surge occurs due to a short circuit, the voltage will drop for the interval before the fault is removed from the system. In such cases, the undervoltage relay will respond to such voltage drops and transfer the load from the primary to the emergency source, thus not only adding a burden to the circuit breaker of closing on a fault but also prolonging the period during which the fault is fed with electrical energy.

Accordingly, my invention contemplates a circuit arrangement in which the undervoltage relay distinguishes between a voltage drop caused by a failure of the primary source and a voltage drop due to a short circuit or to starting currents of motor loads.

In essence, I provide an undervoltage relay provided not only with a first voltage responsive element but also with a second current responsive element which modifies the action of the voltage responsive element in accordance with the currents in the primary source circuit.

When a voltage drop occurs due to a failure of the primary source, no current flows in the current responsive element and the undervoltage relay operates in its usual manner. When the voltage drop to which the voltage coil responds is due to a heavy current surge such as a fault current or a starting current, the action of the responsive voltage element is modified by the energization of this second or current responsive element. This will effect a delay in the action of the undervoltage relay sufficient to prevent transfer before the protecting circuit breaker has disconnected the fault and restored normal voltage to the primary source.

If the current surge is due to a short circuit, the fault current device of the circuit breaker will function to trip the circuit breaker protecting against the fault. The removal of the fault restores voltage to the normal source before the undervoltage relay can effect a transfer.

If the current surge is due to a motor starting current, voltage is restored after normal conditions return. The undervoltage relay will be delayed from operating to transfer from the primary to the emergency source of power until the voltage has again been restored to normal after full motor starting operations.

If a dangerous overload has caused the voltage drop, the protecting circuit breaker is calibrated to open the circuit and restore normal voltage before the undervoltage relay can respond to effect a circuit transfer.

Accordingly, an object of my invention is to provide a novel system in which transfer from a primary to emergency source is achieved solely when the primary source fails.

A further object of my invention is to provide a novel system in which transfer switches are prevented from being operated by undervoltage relays when the voltage drop is due to a short circuit.

Still another object of my invention is to provide a novel circuit arrangement which prevents transfer from a primary to an emergency source by undervoltage relays when the voltage drop is due to motor starting currents.

A further object of my invention is to provide a novel system in which an undervoltage relay distinguishes between the duration of an undervoltage due to a failure of a primary source and an undervoltage due to fault current surges.

Still a further object of my invention is to provide a novel circuit arrangement in which a voltage drop due to a failure of a primary source is distinguished from a voltage drop due to the starting currents of a motor load.

Another object of my invention is to provide a novel undervoltage relay having a voltage responsive coil and a current responsive coil.

A further object of my invention is to provide a novel undervoltage relay having a voltage responsive coil and a novel time delay.

These and other objects of my invention will be more clearly understood from the detailed description of the invention when taken in connection with the drawing in which:

Figure 3 is a circuit diagram utilizing a beam type undervoltage relay with dashpot or other restraining means.

Figure 1:
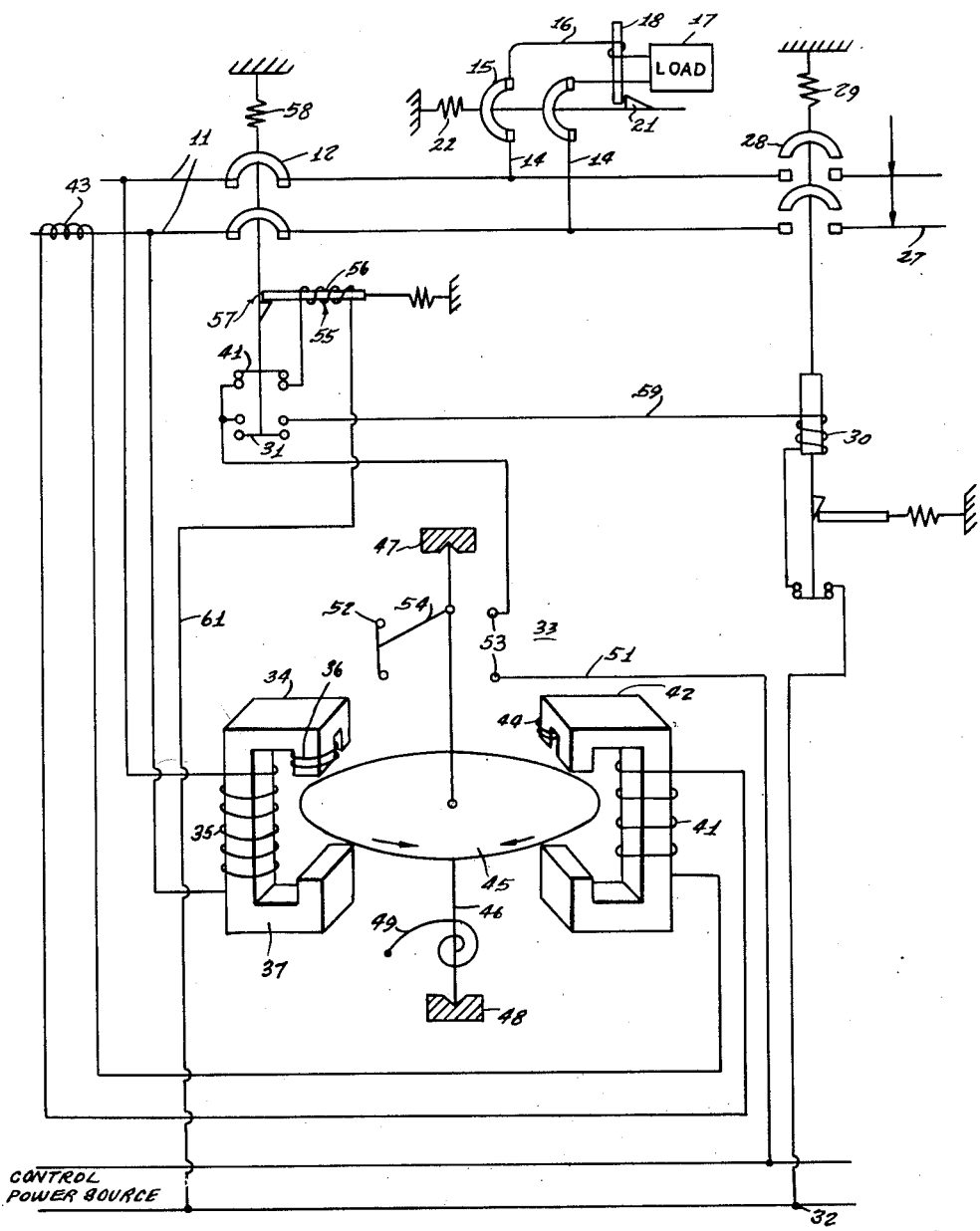
Figure 1 is a schematic circuit diagram of one form of my invention using a current retarding coil on an undervoltage relay.

Referring to Figure 1, I have shown here a source of normal supply 11 which extends through the contacts of a circuit breaker 12 to feed lines 14, circuit breaker 15, and overcurrent trip coil 16 to a load 17. The overcurrent trip 16 comprises a winding in series with the line which operates the solenoid 18 to remove the latch 21 from the circuit breaker arm which is thereupon operated by its spring 22 to disconnect the load 17 from the line 14 in the event of a fault in the line. Although for purposes of illustration only one load 17 is shown, it will be understood that there may be and usually are a number of loads. Moreover, the operating mechanism of the circuit breaker 15 is here shown only schematically.

An emergency source 27 is normally disconnected from the load by circuit breaker 28 (also shown schematically), spring biased to its open position by spring 29 and operable to circuit closing position by the closing coil 30 having an energizing circuit from the control power source 32 to contacts of an undervoltage relay 33.

The undervoltage relay 33 is provided with an undervoltage element 34 having a winding 35 connected across the primary source 11 and also having a shading coil 36 wound on magnetic core 37. The undervoltage relay is also provided with a current winding 41 on the core of a magnet 42, the winding 41 being energized from a current transformer 43 in the main line 11. It will be understood, of course, that the winding 41 can also, if desired, be connected in series with the line 11.

A shading coil 44 is also provided on the magnetic core 42. Mounted for rotation between the pole faces of the magnets 42 and 34 is the disk 45 supported on and rotatable with a shaft 46 which in turn is mounted for rotation in bearings 47 and 48.

A spring 49, one end of which is secured to the shaft 46 and the other fixed on the frame of the undervoltage relay normally biases the disk 45 in a counterclockwise direction. The voltage relay 35 normally tends to drive the induction disk 45 in a clockwise direction. With normal voltage across the line 11, the torque due to the magnet 35 overcomes the torque of the spring and the arm 54 rests against a back stop.

When the voltage in the line 11 drops below a predetermined value, the drop in current in winding 35 results in a decrease in the clockwise torque on disk 45, and spring 49 thereupon turns the shaft 46, disk 45 and arm 54 in a counterclockwise direction, until bridging contact 52 rests against stationary contacts 53.

An energizing circuit is thus completed for the trip magnet 55 of the circuit breaker 12 over the conductor 61, contacts 41, contacts 53, 52 and conductor 51 to operate the solenoid 56 withdrawing it from the latching position 57 and permitting the circuit breaker 12 to be operated to its disconnect position by action of its biasing spring 58. On opening of circuit breaker 12, contacts 31 close and a prepared circuit for closing magnet 30 is completed. Magnet 30 is then energized and closes circuit breaker 28.

The above described operation occurs when the drop in voltage across 11 is due to a failure of the source of power and a transfer to the emergency source is desirable. To prevent such a transfer when the voltage drop is due to a fault current condition, winding 41 is provided on the undervoltage relay.

The magnet 42 is provided with the current winding 41, energized from current transformer 43 with a current proportional to the line current, and is arranged to provide a restraint on the action of the biasing spring 49 attempting to rotate the disk 45 in the counterclockwise direction. This restraint delays rotation of the disk 45 sufficiently long to enable the circuit breaker at the fault to isolate the fault and restore voltage conditions to normal.

For normal current values in the main line, the torque due to the current element or coil 41 is negligible and the relay responds solely to the voltage response coil 35. If, however, the current in winding 41 is due to a fault current, the torque produced by the current magnet 42 is such as to substantially oppose the action of the spring 49 and the disk 45 will not rotate despite the voltage drop in line 11 and the corresponding loss in torque due to the drop in current value flowing through the winding 35. In the latter case, before the delayed rotation of disk 45 can cause engagement of contacts 52, 53, the fault current will operate the overcurrent trip device 16 if the fault occurs at this point and the circuit breaker 15 will open, disconnecting the faulty load 17 from the source.

As soon as the fault has been thus isolated from the source 11, the voltage thereacross will be restored to normal and the relay winding 35 will again be fully energized to overcome the bias of the spring 49 thus preventing any further tendency of the arm 54 from operating toward the contacts 53.

In the event that the energization of the winding 41 is due to current caused by motor starting loads, the duration of this will only exist so long as the starting currents exist. During this time, the current in winding 41 will set up forces which delay rotation of the disk 45 as described above. As soon as the starting currents have restored to normal operating currents the voltage across the line 11 will be restored to full voltage and again the winding 35 will be energized to prevent operation of the disk 45 by the spring 49.

On the other hand, if the voltage drop in line 11 is due to a failure of the primary source the undervoltage winding 35 will respond to a drop in voltage in the line 11 and there will be substantially no opposition to the action of the spring 49 which will thereupon rotate the disk 45 and its shaft 46 in a counterclockwise direction until the arm 52 engages the contact 53 effecting a disconnection of the circuit breaker 12 and the closing operation of the circuit breaker 28 to transfer energy from the normal supply to the emergency source as described above.

Figure 2:
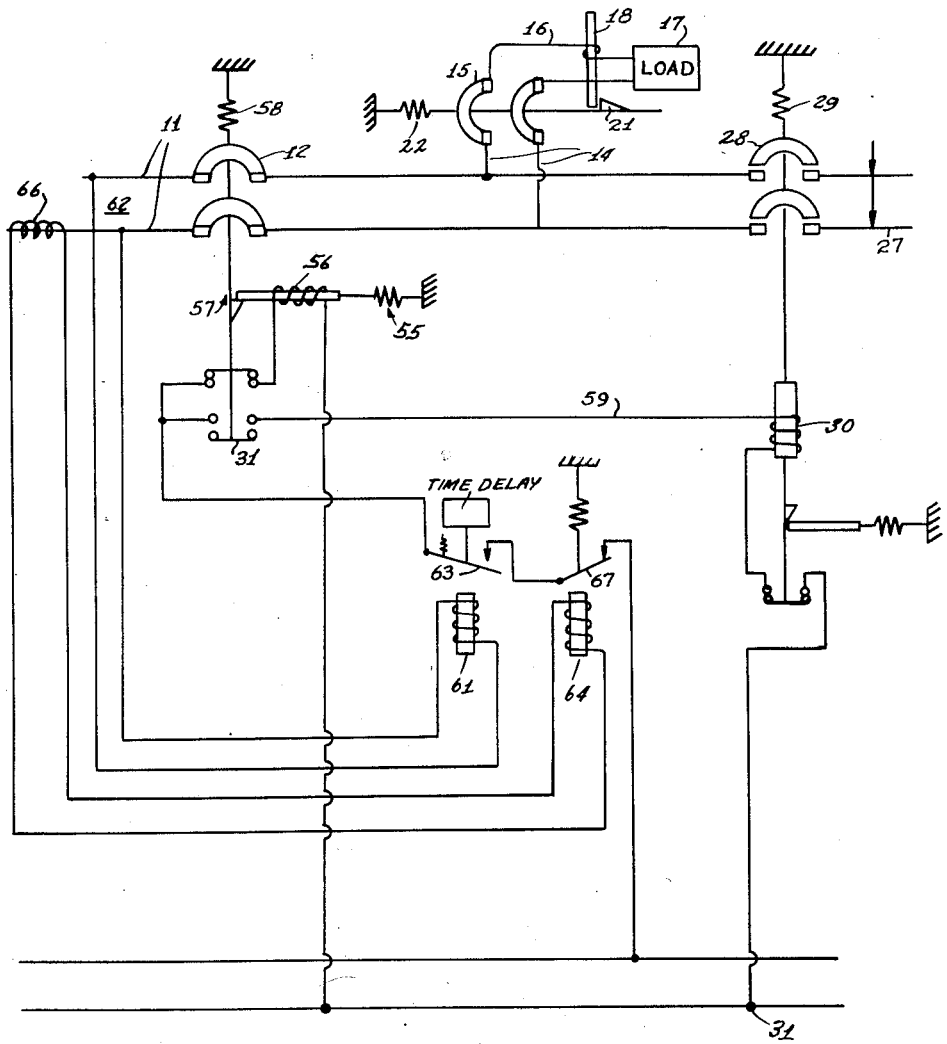
Figure 2 is a schematic circuit diagram in which the undervoltage relay is provided with a current coil controlling one contact and a voltage coil controlling a second contact.

In Figure 2 I have shown a modification of my invention. In this embodiment a voltage coil 61 is connected across the source 62 and has a circuit arrangement similar to that shown in Figure 1. Winding 61 is responsive to any voltage drop across the line 62 and controls the movable contact 63 on its armature.

A second or current relay 64 having a winding either connected in series with the line 62 or energized by a current transformer 66 in the line 62 operates an arm contact 67 in the manner well known in the art. Contact 67 and contact 63 are connected in series and control energization of the trip coil 56 of the main supply circuit breaker 12 and the closing coil 30 of the emergency supply source circuit breaker 28.

In this case, armature contact 63 may be delayed in its action by any well known time delay device such as a dashpot or escapement mechanism. Normally, when the voltage across the supply source 62 drops due to a fault or to a momentary overload such as a starting current, the resulting decrease in energization of the winding 61 will permit its armature to fall back under control of its time delay.

Simultaneously, relay 64 will be energized to instantaneously operate its contact 67 to circuit opening position, and the tripping circuit through 56 will not be completed. If the voltage drop is due to a fault the trip coils of the circuit breaker protecting against the fault will operate that particular circuit breaker to remove the fault from the system and in the meantime the transfer initiated by voltage relay 61 will be blocked by current relay 64. The time delay on relay 61 insures that the transfer is blocked by opening contact 67 before contact 63 closes.

Isolation of the fault will thereupon restore the full voltage to the system and the relay 61 will be fully energized before contacts 63 have been closed and no transfer will occur.

In the event that the voltage drop was due to a starting current overload the same operation as described above will occur. Before contacts 63 can be closed normal conditions will have been restored and the full voltage again across the winding 61 will prevent closing of the contacts 63.

On the other hand, should the voltage drop be due to a failure of the primary source, the contacts 63 will close after an interval of time and in series with the contacts 67 (since relay 64 will not have been energized) will complete the transfer operations as described above.

It will be clear from the above illustrations, that in this and the other embodiments here shown, the current coil may be dispensed with if desired and complete reliance be placed on the time delay or relative duration of a fault current compared to a failure of the source.

In Figure 3 I have shown a still further modification of my invention utilizing a beam type relay comprising an armature 81 pivoted at 82. Normally, the armature 81 is acted upon by the voltage coil 83 on one side of the pivot 82 and counter-balanced by a spring 84 acting to bias the armature 81 against the action of the voltage coil 83. A current coil 85 also acts against the biasing spring 84 and a time delay 86 of the dashpot type is connected to the armature 81 to delay its action.

With normal voltage at the source, the current through the winding 83 overcomes the action of the spring 84 and the armature 81 remains in the position shown. With normal current in the line the action of the current coil 85 is negligible.

When the voltage across the source drops below the normal value the action of the spring 84 will overcome the magnetic force due to the current winding 83 and the armature 81 will be moved about its pivot 82 to close the transfer initiating circuit. Such movement, however, will be delayed by the time delay mechanism 86. If the current element 85 is energized by a fault current substantially no movement of the armature will occur since the magnetizing force of the current element 85 will oppose the action of the spring 84. If the fault has been cleared by a circuit breaker at the fault, as described above, or if the current through the winding 85, due to starting currents, is reduced by the restoration to normal of load currents after the motor load has attained its full speed, and the voltage across the line will also have been restored and the energization of the winding 83 will prevent any movement of the armature 81.

Accordingly, under these circumstances no transfer will occur.

As will now be clear from the above description, by a novel circuit arrangement and construction of an undervoltage relay with a time delay action of the undervoltage relay and a blocking action in response to current magnitude, I have made possible the discrimination between undervoltages due to loss of the source and undervoltages due to faults or overloads.

I claim:

1. A power system having a primary and an emergency source; switching means for disconnecting said primary source and for connecting said emergency source to a load; said switching means being inoperative when said power system has a voltage drop accompanied by an overload current.

2. A power system having a primary and an emergency source; switching means for disconnecting said primary source and for connecting said emergency source to a load; said switching means being inoperative when said power system has a voltage drop accompanied by an overload current and means to render said switching means operative when said power system has a voltage drop which is not accompanied by an overload current.

3. A power system having a primary and an emergency source; switching means for disconnecting said primary source and for connecting said emergency source to a load; and means responsive solely to a failure of said primary source for operating said switching means, said means being responsive to a voltage drop at said primary source; and means operative in the event said voltage drop is accompanied by an overload current from said primary source for preventing the operation of said first mentioned means.

4. A power system having a primary and an emergency source; switching means for disconnecting said primary source and for connecting said emergency source to a load; and means for operating said switching means responsive to the voltage drop of said primary source for a duration which is longer than the time required to isolate the fault in the system which might have caused the voltage drop.

5. In a power supply system having a primary source; a secondary source for a load; switching means for disconnecting said primary source and connecting said emergency source to said load and an undervoltage relay mechanism responsive to a change in voltage of said source for operating said switching means to transfer power supply from said primary source for said load to said secondary source; and means for blocking said operation of said undervoltage relay in the event that said voltage drop is accompanied by overload currents from said primary source.

6. In a power supply system having a primary source; a secondary source for a load; switching means for disconnecting said primary source and connecting said emergency source to said load and an undervoltage relay mechanism responsive to a change in voltage of said source for operating said switching means to transfer power supply from said primary source for said load to said secondary source; and a time delay control of said undervoltage relay for delaying its operation following a drop in voltage.

References Cited in the file of this patent

UNITED STATES PATENTS

| 1,603,049 | Hall | Oct. 12, 1926 |
| 1,786,310 | McCullough | Dec. 23, 1930 |
| 1,893,179 | Parsons | Jan. 3, 1933 |